United States Patent [19]

Sparks

[11] 3,854,055
[45] Dec. 10, 1974

[54] STATE AND SEQUENCE DETECTOR

[75] Inventor: James E. Sparks, Riverside, Calif.

[73] Assignee: Bourns, Inc., Riverside, Calif.

[22] Filed: Nov. 29, 1973

[21] Appl. No.: 420,239

[52] U.S. Cl............ 307/115, 317/135 R, 307/247 R
[51] Int. Cl. .......................................... H01h 19/14
[58] Field of Search........ 307/112, 113, 115, 247 R; 317/135 R

[56] References Cited
UNITED STATES PATENTS
3,446,985   5/1969   Carlisle et al...................... 307/113

Primary Examiner—Robert K. Schaefer
Assistant Examiner—M. Ginsburg
Attorney, Agent, or Firm—William G. Becker; Richard S. Koppel

[57] ABSTRACT

A system is disclosed which permits the sequence of occurrence of a plurality of events to be monitored and which prevents operation of a machine unless the monitored events occur in a predetermined order. The system of the present invention is particularly suitable for use with any machine or apparatus which operates in a series of discrete or sequential steps, and which is controlled manually in part and automatically in part. The relative state and sequence detector system of the present invention includes a J-K flip-flop circuit for monitoring changes in the operating state of the apparatus, and further includes a logic network for sensing the condition of a plurality of indicators representing the operating states of a plurality of components within the apparatus. The output of the logic network are used to arm the J-K flip-flop and to supply command signals to the automatic control portion of the machine or apparatus.

11 Claims, 1 Drawing Figure

PATENTED DEC 10 1974
3,854,055
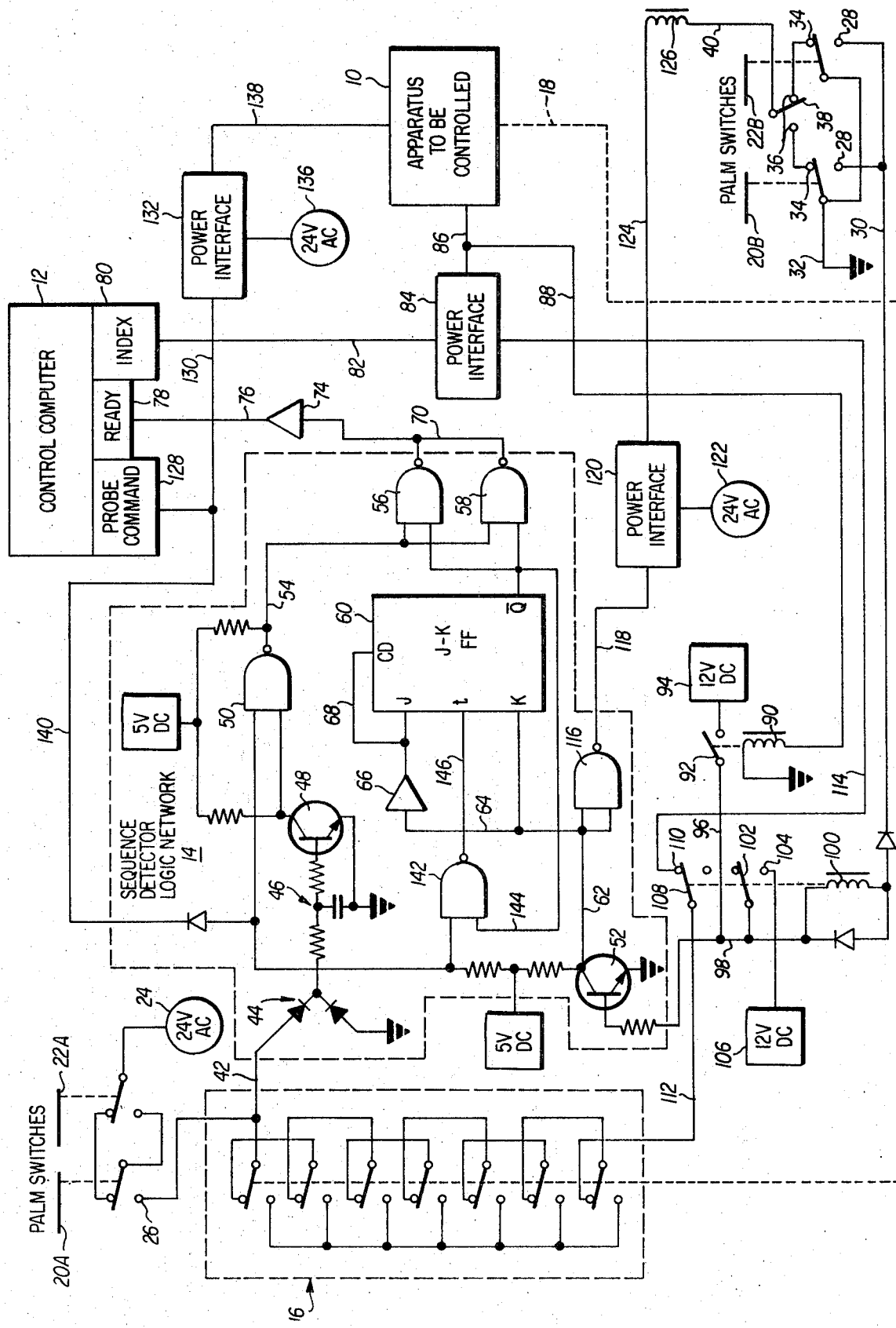

STATE AND SEQUENCE DETECTOR

BACKGROUND OF THE INVENTION

1. Field of the Invention

This invention relates generally to a circuit for detecting the operating sequence of an apparatus, and more particularly to a circuit for monitoring the state of an apparatus as well as the operating sequence thereof and for thereby controlling further operating cycles of the apparatus.

2. Description of the Prior Art

Many situations exist in which an apparatus is partially controlled by a computer or other control network, and is also partially controlled manually by a human operator. In such cases, it is often desirable for purposes of the safety of the operator to monitor the operating sequence of the apparatus in order to insure that the manually controlled portions of the operation of the apparatus occur in a proper sequence with respect to the automatically controlled portions of the operation.

For example, in the operation of a press, or equivalent cyclically operating machine tool, the basic cycling of the machine components may be controlled by a central mini-computer which regulates the operating sequence of a large number of machines on a time-shared basis. In such cases, however, loading of raw materials or removal of finished products from the individual machines are often accomplished manually. Each machine is then equipped with palm switches or equivalent manual controls so that the human machine operators may override the automatic sequencing of the machine in order that the machine does not operate at any time when it might endanger the operator. In systems of this type it is essential to verify the fact that the palm switches are properly sequenced during each operating cycle of the machine, and have not simply been tied down by the operator so that the machine continues to operate cyclically without the specific attention of the operator.

Naturally a press is only one example of a machine having operator safety features which must be monitored. Numerous other machines also employ safety restraints and the like which should be engaged before the machine can be operated. Thus there is presently a demand for efficient devices for monitoring the safety features associated with various machines.

Control circuits have been proposed in the past which are designed for use in the above-described circumstances and which are intended to prevent the operation of such a machine if the manually operated switches are not properly actuated during the machines operating cycle. For example, one system of this type is disclosed in U.S. Pat. No. 3,446,985, issued May 27, 1969 to B. H. Carlisle, et al. However, in the Carlisle system an operator is required to depress a pair of palm switches during a specified portion of a machine cycle. Thus the Carlisle system lacks flexibility and can result in unnecessary stopping of machine cycles due to relatively minor errors in operator timing. As a result the Carlisle control system can cause substantial inefficiencies in a manufacturing operation. Furthermore the circuit components required to produce the Carlisle circuit are many and varied, so that the Carlisle system is expensive and inefficient to construct and utilize. Accordingly an improved circuit for monitoring the operating sequence of the type of machine described above is needed which does not render the machine inoperative for an inordinate period of time. Furthermore, an improved monitoring circuit of the type described is needed which can be produced from modern integrated logic networks and which is both economical and convenient to manufacture and install.

SUMMARY OF THE INVENTION

Accordingly, one object of this invention is to provide a novel circuit for monitoring the relative state and operating sequence of an apparatus which is controlled manually in part and automatically in part.

Another object of this invention is the provision of a novel relative state and sequence detector system for use in monitoring and controlling the operation of an apparatus which is partially controlled by a human operator.

Yet another object of this invention is the provision of a novel circuit for monitoring the relative state and operating sequence of an apparatus which prevents tying down of manual control switches associated with the apparatus.

A still further object of this invention is the provision of a unique solid state logic network for monitoring the operating sequence of an apparatus and for preventing unauthorized operating sequences.

Another object of this invention is to provide an improved circuit for monitoring the use of safety devices associated with various types of machines.

Briefly, these and other objects of the invention are achieved by providing a logic network including a J-K flip-flop circuit in the control system of a machine which is partially controlled manually by an operator, and partially controlled automatically by a central control facility. The J-K flip-flop and its associated logic circuitry monitor the states of a plurality of manually operated switches in conjunction with a series of commands from a central control unit for determining whether the manual switches have been cycled in a proper relationship with respect to the commands from the central control unit. In particular, the logic network and J-K flip-flop prevent cycling of the machine if the manually operable switches are tied down or otherwise prevented from being operated during each cycle of the machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

The FIGURE is a combined schematic and logic block diagram of the relative state and sequence detector system of the present invention.

DESCRIPTION OF THE PREFERRED EMBODIMENT

Referring now to the drawing, the relative state and sequence detector system of the present invention is shown as including an apparatus to be controlled 10, which may be an automated press or any other type of machine capable of partially automatic and partially manual operation, coupled to a control computer 12 and to a sequence detector logic network 14. The control computer 12, which may be a Data General NOVA 1200 model general purpose computer for example, is designed to control a plurality of apparatuses 10 on a time-shared basis. For example, in a manufacturing facility, a single computer could be used to control a plurality of semi-automated presses on a time-shared basis. However, the present invention is not limited to use in conjunction with a general purpose computer and thus the control computer 12 in the FIGURE may simply be a conventional special purpose circuit designed to control a single apparatus 10.

A plurality of conventional microswitches or limit switches 16 are mechanically coupled to the apparatus 10 in a suitable manner as designated by a dashed line 18. As is well known to those skilled in the art, microswitches of the type illustrated at 16 are conventionally coupled to, and actuated by, various mechanical movements within the apparatus 10. For example, in a press various microswitches are used to sense the positions of probes which in turn identify the position of the press ram and the other working components. Naturally, microswitches of the type illustrated can be used to represent the state of any number of mechanical elements in various types of apparatuses other than presses or machine tools. The microswitches 16 function to prevent operation of the apparatus 10 unless the mechanical components which are monitored by the microswitches 16 are in the proper position for actuation. Thus the microswitches 16 serve to prevent actuation of the apparatus 10 by the control computer 12 unless the microswitches are all in the position shown in the FIGURE, as will be explained in more detail below.

A pair of palm switches 20A-20B and 22A-22B are provided to permit manual control of the apparatus 10. Each palm switch includes A and B portions which, although illustrated as being widely separated in the FIGURE, are actually coupled together and are actuated together by movement of a single button or lever. The palm switches 20A-20B and 22A-22B may be any conventional type of manually operable switch although the A and B segments of each switch are provided for controlling separate circuits. The palm switch portions 20A and 22A are coupled in series between an alternating current power source 24 and an activating contact 26. Thus both switches 20A and 22A must be closed before a circuit is completed between the power source 24 and the activating contact 26. In contrast, the switch portions 20B and 22B are coupled in parallel between a pair of contacts 28 which are coupled to a solenoid circuit line 30. Thus when either of the palm switches 20B or 22B is engaged, a circuit is completed between the solenoid circuit line 30 and a ground or reference potential 32. When the palm switch portions 20B and 22B are not actuated, the switch armatures normally engage a pair of contacts 34. The contacts 34 are coupled to an additional pair of contacts 36 which are selectively engaged by the armature of a toggle switch 38. The toggle switch 38 selectively couples a load station solenoid line 40 with either one of the contacts 36. When the palm switches 20B and 22B and the toggle switch 38 are in positions illustrated in the FIGURE, a circuit is completed from the load station solenoid line 40 through the armature of toggle switch 38 and the armature of palm switch 22B to the ground 32. Thus with the toggle switch 38 in the illustrated position, control of the load station solenoid circuit is governed by the position of palm switch 22B. However, by moving toggle switch 38 to its other position, the load station solenoid circuit is governed by the armature of palm switch 20B. Thus the toggle switch 38 provides a means for selecting which of the two palm switches is used to control the load station solenoid circuit.

This feature is useful when the relative state and sequence detector system of the present invention is used in conjunction with a manufacturing apparatus. In this case, the palm switches 20A-20B and 22A-22B are physically separated from one another requiring that the operator use both hands to actuate both palm switches. When this arrangement is used in conjunction with a manufacturing apparatus such as a press, the operator must control the load station solenoid with one hand while inserting a workpiece into the apparatus 10 with the other hand. Thus selection of either the palm switch 20B or 22B for controlling the load station solenoid permits the operator to select either the left or right hand switch depending upon whether the operator is left handed or right handed. Accordingly, the operator can maintain either hand free for insertion of parts into the apparatus 10.

The palm switch portions 20A and 22A are used to initiate operation of the sequence detector logic network 14. Thus, when both palm switches 20A and 22A are depressed, power is applied from the AC power source 24 to the activating contact 26. The voltage at the contact 26 is passed through all of the microswitches 16 to insure that all of them are in the position shown in the FIGURE, and is also applied over an input line 42, through a rectifying diode 44 and a biasing circuit 46, to the base of transistor 48, switching on the transistor. When the transistor 48 is switched on, it applies a low voltage (logical 0) to one input of a two input NAND gate 50. Since the other input of NAND gate 50 initially carries a high voltage (logical 1) due to the fact that a second transistor 52 coupled to that input of NAND gate 50 is initially off, switching of the transistor 48 causes the output of NAND gate 50 to switch from a logical 0 to a 1. This 1 output is coupled through a line 54 to one input of a NAND gate 56 and to one input of a NAND gate 58. The other input of both NAND gates 56 and 58 is coupled to the $\bar{Q}$ output of a J-K flip-flop 60, so that the state of the $\bar{Q}$ output determines the output produced by each of the NAND gates 56 and 58.

Since, as mentioned above, the transistor 52 is initially switched off, a logical 1 is applied over lines 62 and 64 to the K input of J-K flip-flop 60 and also to an inverter 66. The output of the inverter 66 is a logical 0 which is applied over line 68 to the CD, or reset, input of the J-K flip-flop 60, insuring that the flip-flop is in reset condition. Under these conditions the logical 1 applied to the K input of the J-K flip-flop appears at the $\bar{Q}$ output of the flip-flop so that with the logical 1 signal on line 54, a logical 1 is applied to both inputs of both NAND gates 56 and 58. Thus NAND gates 56 and 58 apply a logical 0 to a line 70 which is coupled to an inverter 74. The output of the inverter, a logical 1, is applied over a line 76 to a ready input 78 of the control computer 12, indicating to the computer that the apparatus 10 is prepared to receive its next command. Thus, depressing the palm switches 20A and 22A initially causes a "ready" signal to be transmitted to the control computer 12.

Upon receiving the "ready" signal the control computer 12 generates an "index" signal from its index output 80. The "index" signal may be intended, for example, to rotate a part which has been inserted into a press from a loading position to a work position. Naturally, the "index" signal is simply a command signal and could be used to perform any desired function depending upon the type of apparatus with which the present invention is used.

The "index" signal is transmitted over a line 82 to a power interface circuit 84 wherein the logic voltage level signal from the computer 12 is converted into a working voltage or power level signal in a manner well known to those skilled in the art. For example, the power interface circuit 84 may simply include a relay which couples an AC power source to an output line in response to receiving logic level signal on an input line. Relay circuits of this type are conventional, and thus a more detailed description of this circuit is omitted for purposes of brevity.

The "index" power signal is fed over a line 86 to the apparatus 10 to carry out the indexing operation, and is also applied over a line 88 to a solenoid 90. The "index" power signal actuates the solenoid 90, closing an armature 92 thereof, whereby a voltage source 94 is coupled through a line 96 to a line 98 which is in turn coupled to both the base electrode of transistor 52 and to the actuating coil of a second solenoid 100. The solenoid 100 is also coupled through the solenoid circuit line 30 to the contacts 28 of palm switches 20B and 22B. Thus, as explained above, when either of the palm switches are actuated, a circuit is completed from the contacts 28 through the armature of either palm switch to the ground 32.

Since the palm switches are actuated at this point in the operating cycle of the circuit of the present invention, actuation of solenoid 90 causes the solenoid 100 to be actuated and latched through the contacts of palm switches 20B and 22B. More particularly actuation of solenoid 100 causes an armature 102 to engage a contact 104, whereby a holding voltage source 106 is coupled to line 98, providing the voltage necessary to latch solenoid 100 in its actuated position. Similarly, actuation of the solenoid 100 pulls an armature 108 out of engagement with a contact 110 thereby breaking the circuit initially existing between a line 112 coupled to microswitches 16 and a line 114 coupled to power interface circuit 84. The purpose of this circuit arrangement will now be explained in more detail. Upon initial closure of palm switches 20A and 22A, the AC power source 24 is applied over line 42 to the sequence detector logic network 14, as described previously, and is also coupled through the line 42 to the microswitches 16. When all of the microswitches are in their proper positions, a closed circuit is established through all of the microswitches as shown in the FIGURE. Thus the AC power source 24 is directly coupled to line 112, and since the armature 108 initially engages contact 110, line 112 is directly coupled through line 114 to the power interface circuit 84 for supplying the power necessary to accomplish the "indexing" operation once an appropriate command is received from the control computer 12. Thus, as described above, when an "index" command is received from the control computer 12, the power interface circuit 84 couples the power input line 114 to the output line 86 whereby indexing power is supplied to the apparatus 10. However, when the solenoid 100 is actuated, the armature 108 is pulled out of engagement with contact 110, breaking the circuit to the power interface 84 and rendering impossible any further indexing operations.

The actuation of solenoid 100 is sensed by transistor 52 which is immediately switched on when the solenoid 100 is actuated. As a result, a logical 0 is applied to line 62, and this logical 0 is applied to both inputs of a NAND gate 116, since both of these inputs are tied together as shown in the FIGURE. The Nand gate 116 thus provides a logical 1 output on line 118 which is fed to a power interface circuit 120. The power interface circuit 120 may be indentical to power interface circuit 84, and preferably includes a relay for coupling an AC power source 122 to a line 124 which supplies power to a load station solenoid 126.

The logical 0 on line 62 is also supplied over line 64 to inverter 66, whereby the reset signal is removed from the CD input of the J-K flip-flop 60. Thus the sequence detector logic network 14 is primed to receive a command signal from the control computer 12.

At a predetermined interval after the "index" command is given, the control computer 12 supplies a "probe down" signal from its probe command output 128. As with the "index" command described earlier, the "probe down" command can be any type of command signal for instructing the apparatus 10 to perform any suitable function. When the apparatus 10 is a press, the "probe down" command may signal the lowering of a probe which is associated with the press ram, for example. The "probe down" command is applied over a line 130 to a power interface 132, which may be identical in structure to the power interface 84 described above. An AC power source 136 is also coupled to the power interface 132 for supplying power over a line 138 to the apparatus 10 whereby the "probe down" command may be carried out.

The "probe down" command, which is a logical 0, is also applied over a line 140 to one input of a NAND gate 142 located in the sequence detector logic network 14. The other input of NAND gate 142 is supplied with a logical 1 over a line 144 which is coupled to the Q̄ output of the flip-flop 60. Thus the output of NAND gate 142 is a logical 1 which is applied over line 146 to the triggering input $t$ of the flip-flop 60. Accordingly, the flip-flop 60 is primed to change state upon receiving a "probe up" signal (logical 1) from the control computer 12. The J-K flip-flop 60 therefore acts a memory by storing the "probe down" command information.

However, the triggering capability of the J-K flip-flop 60 is controlled by the state of solenoid 100. More particularly, if the solenoid 100 is released before the "probe up" command is given, transistor 52 will be switched off resulting in the application of a logical 1 to inverter 66, which in turn results in the application of a reset signal to the CD input of flip-flop 60. This reset signal, of course, prevents the flip-flop 60 from changing state. Since releasing of the solenoid 100 can be caused only be releasing the palm switches 20A–20B and 22A–22B, it is clear that releasing the palm switches prevents the flip-flop 60 from changing state when the "probe up" command is given.

If the solenoid 100 is not released prior to the "probe up" command, the flip-flop 60 changes state when the "probe up" command is received from the control computer 12. This results in a logical 0 appearing at the Q output of flip-flop 60, causing the outputs of NAND gates 56 and 58 to switch from a 0 to a 1. This logical 1 signal is applied over line 70 to inverter 74, which provides a logical 0 output over line 76 to the ready input 78 of control computer 12, indicating to the computer that the apparatus 10 is not ready to begin another operating cycle. Thus the apparatus 10 is removed from the control of the control computer 12 if the solenoid 100 is not released at the proper time.

As pointed out above, a failure of the solenoid 100 to release prior to the "probe up" command time is indicative of a failure to release the palm switches 20A–20B and 22A–22B. Accordingly, if the operator does not release the palm switches after the operating cycle of the apparatus 10 is completed, the apparatus 10 will not be permitted to begin a further cycle of operation. Thus the operator is prevented from tying down the palm switches and keeping the apparatus 10 in a continuous cycle of operation. However, with the circuit of the present invention, the operator can release the palm switches during the operating cycle of the machine (i.e., at some time after the "probe down" command but prior to the "probe up" command) and subsequentially redepress the palm switches so that the apparatus 10 will then be able to begin its next cycle immediately on completion of the first cycle. Thus the circuit of the present invention provides the desired function of preventing an operator from tying down the palm switches 20A–20B and 22A–22B, and yet does not result in any wasted time during each machine cycle, provided that the operator depresses, releases and redepresses the palm switches during the running cycle of the apparatus 10.

To further facilitate understanding of the present invention the operation thereof will now be briefly summaried. The palm switches 20A–20B and 22A–22B are first depressed, coupling the AC power source 24 to the plurality of microswitches 16 which determine if the mechanical components of the apparatus 10 are in proper position for actuation. If all mechanical components are in proper position, all of the microswitches 16 will be closed as shown in the FIGURE, and the AC power source 24 will be coupled through armature 108 of solenoid 100 to the power interface circuit 84. Depression of the palm switches also couples the AC power source 24 to the base of transistor 48, whereby this transistor is triggered, causing the output of NAND gate 50 to switch to a logical 1. The output of NAND gate 50 causes NAND gates 56 and 58 to switch resulting in a logical 0 output on line 70 which is converted to a logical 1 by inverter 74 and applied to the ready input 78 of control computer 12 to instruct the computer that the apparatus 10 is ready to begin its running cycle. An "index" command is then supplied from the control computer 12 to the power interface circuit 84, causing the apparatus 10 to be indexed and simultaneously causing solenoid 90 to engage, which in turn causes solenoid 100 to engage. Transistor 52 is triggered upon the engagement of solenoid 100, whereby J-K flip-flop 60 is prepared to receive a triggering input through NAND gate 142. After a brief interval, a "probe down" command is supplied from the control computer 12 to the NAND gate 142 with the result that the J-K flip-flop 60 is primed to change state. If the palm switches 20A–20B and 22A–22B are not released prior to the receipt of a "probe up" command from the computer 12, the J-K flip-flop 60 changes state upon receipt of the "probe up" command, thereby disabling the ready input 78 of the control computer and preventing further cycling of the apparatus 10. However, if the palm switches are released prior to the "probe up" command, the J-K flip-flop 60 is reset and the operating cycle of the machine is permitted to continue when the palm switches are again depressed.

The effect of this operating sequence of the circuit of the present invention is therefore to permit normal operation of the apparatus 10 without any loss of time due to the addition of the sequence detector logic network 14, provided that the palm switches are depressed and released in the proper manner. However, if at any time the sequence of the system is disrupted or a portion of the system malfunctions or does not complete a function, the circuit will fail to be properly reset resulting in an immediate indication to the controlling device that operation of the apparatus 10 should be halted. The apparatus is reset to its fully operative condition as soon as the operator properly cycles the palm switches, so that the apparatus 10 can then continue its normal operation.

Various biasing circuit components and other conventional elements are illustrated in the FIGURE but have not been described in detail in view of the fact that they are conventional and are well known to those skilled in the art. Naturally, these elements can be replaced with equivalent elements or can be modified in various manners well known to those skilled in the art, and are not therefore considered essential to the understanding or practice of the present invention. Furthermore, although various separate voltage sources are shown in the FIGURE for purposes of clarity, it will be appreciated by those skilled in the art that in practice many of these sources can be combined.

Although a sophisticated computer is described in the specification for performing the functions of the control computer 12, it will be readily apparent to those skilled in the art that a sophisticated computer of the type described is only required where a large number of machines are being controlled on a time shared basis, or wherein numerous functions in addition to those specifically described therein are being performed by the computer. Thus for the purposes of the present invention, wherein the control computer 12 is required to respond to only one input signal and provides only two output signals in timed sequence, it will be apparent to those skilled in the art that a simple special purpose circuit can easily be constructed to perform the functions required of the control computer 12. Alternatively, it is believed clear that programming any type of general purpose computer to perform the functions ascribed to the control computer 12 of the present disclosure would be an extremely simple matter to those skilled in the art of computer programming.

Although the logic circuit components of the sequence detector logic network 14 are schematically illustrated as discrete components, one or more integrated circuits may be used to form all of the components in the network 14. Similarly, although an integrated circuit J-K flip-flop is preferred, it will ble apparent to those skilled in the art that any conventional triggered or clocked J-K flip-flop will suffice for the purposes of the present invention.

Although the present disclosure has referred to a press as an example of the apparatus 10, it will be apparent to those skilled in the art that the apparatus 10 may be any type of apparatus which is partially controlled by a human operator and partially controlled automatically. Thus the relative state and sequence detector system of the present invention can be used with any type of apparatus meeting these broad characteristics for the purpose of preventing operation of the apparatus unless the operator performs a predetermined sequence of manual operations. Accordingly, the system of the present invention has applicability in many areas other than machine tool control.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a relative state and sequence detector system which includes an apparatus to be controlled, said apparatus designed to undergo repeated operating cycles, and a control means coupled to said apparatus for applying sequential automatic control signals thereto for governing said operating cycles, wherein the improvement comprises the provision of:
   manually operable switch means coupled to said apparatus and to said control means for actuating said apparatus and for governing the application of said automatic control signals to said apparatus, said manually operable switch means including means for opening and closing a plurality of circuits; and,
   sequence detector logic means including a logic network coupled to said manually operable switch means and to said control means for stopping said apparatus from continuing said operating cycles unless said plurality of circuits are sequentially closed and opened by operation of said manually operable switch means in a predetermined manner, said sequence detector logic means enabling an uninterrupted application of said sequential automatic control signals to said apparatus in response to said plurality of circuits undergoing a change of state during the interval between a predetermined pair of said automatic control signals.

2. A relative state and sequence detector system as in claim 1, wherein said sequence detector logic means comprises:
   memory means for storing automatic control signal information from said control means, and
   electronic switch means coupled to said memory means for controlling the state thereof.

3. A relative state and sequence detector system as in claim 2, wherein:
   said memory means includes a J-K flip-flop circuit.

4. A relative state and sequence detector system as in claim 2, wherein said plurality of circuits include:
   bistable means coupled to said control means and to said electronic switch means for causing said electronic switch means to change state in response to the generation of a first control signal by said control means.

5. A relative state and sequence detector system as in claim 4, wherein said bistable means includes:
   first electromechanical switching means coupled to said control means and responsive to the generation of said first control signal,
   second electromechanical switching means coupled to said first electromechanical switching means and to both said manually operable switch means and said electronic switch means, said second electromechanical switching means actuated by said first electromechanical switching means provided said manually operable switch means is in its actuated state.

6. A relative state and sequence detector system as in claim 1, wherein said sequence detector logic means further comprises:
   first electronic switch means coupled to said manually operable switch means for actuation thereby,
   first logic gate means coupled to said electronic switch means, said logic gate means changing state upon actuation of said electronic switch means; and
   said sequence detector logic means is coupled to said control means by circuit means coupled between said logic gate means and said control means for applying an enabling signal to said control means in response to actuation of said manually operable switch means.

7. A relative state and sequence detector system as in claim 6, wherein said sequence detector logic means further comprises:
   memory means coupled to said logic gate means for controlling the state of said logic gate means,
   second logic gate means coupled to said memory means for providing priming signals thereto; and
   second electronic switch means coupled to said memory means for providing a reset signal to said memory means.

8. A relative state and sequence detector system as in claim 1, wherein said logic network comprises:
   triggered flip-flop circuit means having primary, reset, and triggering inputs and having an output,
   reset circuit means coupled to said reset input for applying a reset signal to said flip-flop circuit means,
   first electronic switch means coupled to said reset circuit means for controlling the output of said reset circuit means, said first electronic switch means also coupled to said primary input,
   first logic gate means coupled to said triggering input for applying triggering signals thereto; and
   second logic gate means coupled to said output of said flip-flop circuit means for providing an output signal from said logic network responsive to the signal present at said flip-flop circuit means output.

9. A relative state and sequence detector system as in claim 8, wherein said logic network further comprises:
   third logic gate means coupled to an input of siad second logic gate means for applying an enabling signal thereto; and,
   second electronic switch means coupled to said third logic gate means for applying an enabling signal thereto.

10. A relative state and sequence detector system as in claim 8, wherein said logic network further comprises:
    circuit means coupling an input of said first logic gate means with said output of said flip-flop circuit means.

11. A relative state and sequence detector system as in claim 9, wherein said logic network further comprises:
    circuit means coupling an input of said first logic gate means with an input of said third logic gate means.

* * * * *

UNITED STATES PATENT OFFICE
CERTIFICATE OF CORRECTION

Patent No. 3,854,055    Dated December 10, 1974

Inventor(s) James E. Sparks

It is certified that error appears in the above-identified patent and that said Letters Patent are hereby corrected as shown below:

Title - "State and Sequence Detector" should read -- Relative State and Sequence Detector --.

Abstract, Line 15, "output" should read -- outputs --.

Column 1, Line 64, "Furthermore the circuit" should read -- Furthermore, the circuit --.

Column 4, Line 32, "base of transistor 48" should read -- base of a transistor 48 --.

Column 6, Line 8, "Nand" should read -- NAND --.

Column 6, Line 67, "Q" should read -- $\overline{Q}$ --.

Column 8, Line 41, "therein" should read -- herein --.

Column 10, Line 50, "siad" should read -- said --.

Signed and sealed this 1st day of April 1975.

(SEAL)
Attest:

RUTH C. MASON
Attesting Officer

C. MARSHALL DANN
Commissioner of Patents
and Trademarks